(12) United States Patent
Yamakage et al.

(10) Patent No.: US 10,372,028 B2
(45) Date of Patent: Aug. 6, 2019

(54) LIGHT SOURCE DEVICE AND PROJECTION TYPE DISPLAY APPARATUS

(71) Applicant: Light Show Technology Co., LTD., Tokyo (JP)

(72) Inventors: Akihiro Yamakage, Tokyo (JP); Yufei Mei, Tokyo (JP)

(73) Assignee: LIGHT SHOW TECHNOLOGY CO., LTD., Tokyo (JP)

( * ) Notice: Subject to any disclaimer, the term of this patent is extended or adjusted under 35 U.S.C. 154(b) by 0 days.

(21) Appl. No.: 15/957,114

(22) Filed: Apr. 19, 2018

(65) Prior Publication Data

US 2018/0314141 A1    Nov. 1, 2018

(30) Foreign Application Priority Data

Apr. 28, 2017   (JP) ................ 2017-089441

(51) Int. Cl.
  *G03B 21/20*   (2006.01)
  *G03B 33/08*   (2006.01)

(52) U.S. Cl.
  CPC ......... *G03B 21/208* (2013.01); *G03B 21/204* (2013.01); *G03B 21/2066* (2013.01); *G03B 33/08* (2013.01)

(58) Field of Classification Search
  CPC ............... G03B 21/208; G03B 21/204; G03B 21/2066; G03B 33/08
  USPC .......................................... 362/84
  See application file for complete search history.

(56) References Cited

U.S. PATENT DOCUMENTS

2012/0162612 A1* 6/2012 Huang ............... G02B 5/20
                                                              353/31
2013/0343033 A1* 12/2013 Matsubara ......... G02B 26/008
                                                              362/19

FOREIGN PATENT DOCUMENTS

JP      2012-78488      4/2012
JP      2012-94439      5/2012

* cited by examiner

*Primary Examiner* — Anh T Mai
*Assistant Examiner* — Jessica M Apenteng
(74) *Attorney, Agent, or Firm* — Wenderoth, Lind & Ponack, L.L.P.

(57) ABSTRACT

A light source device for a projection display apparatus includes a phosphor, an excitation light source, a surface-curved dichroic mirror, and a converging lens. The excitation light source is configured to output excitation light for exciting the phosphor. The surface-curved dichroic mirror has a curved surface and is configured to cause one of the excitation light from the excitation light source and fluorescence from the phosphor to pass through the curved surface and to cause the other of the excitation light and the fluorescence to be reflected on the curved surface. The surface-curved dichroic mirror is configured to cause the one of the excitation light and the fluorescence that passes through, neither to substantially converge, nor to substantially diverge, but converge the other of the excitation light and the fluorescence that is reflected.

9 Claims, 13 Drawing Sheets

INCIDENT ANGLE 35°

INCIDENT ANGLE 45°

INCIDENT ANGLE 55°

INCIDENT ANGLE 35°

INCIDENT ANGLE 45°

INCIDENT ANGLE 55°

PRIOR ART

α0 = 45°
α1 = 35°
α2 = 55°

PRIOR ART

LIGHT SOURCE DEVICE AND PROJECTION TYPE DISPLAY APPARATUS

CROSS-REFERENCE TO RELATED APPLICATION

This application claims the benefit of Japanese Patent Application No. 2017-89441, filed Apr. 28, 2017, which is hereby incorporated by reference herein in its entirety.

BACKGROUND OF THE INVENTION

Field of the Invention

The present invention relates to a light source device that includes a semiconductor laser, a phosphor, and a dichroic mirror, and a projection type display apparatus that uses the light source device.

Description of the Related Art

In recent years, semiconductor lasers have been developed that output light with a short wavelength with high light-emitting efficiency. A phosphor is excited by output light of the semiconductor laser, and light that is wavelength-converted by the phosphor is used as a light source for a projection type display apparatus.

The phosphor may be held at a fixed place and may be illuminated with excitation light. However, when the same point on the phosphor always continues to be illuminated with the excitation light, there is a case where temperature increases and light-emitting efficiently decreases, or there is a likelihood that material deterioration will occur. For this reason, the phosphor is provided on a principal surface of a rotatable circular plate, and a light source is mostly used that is configured in such a manner that the same point on the phosphor is not illuminated in a stationary manner with the excitation light.

For example, JP-A-2012-78488 discloses a projection type display apparatus that causes output light of an excitation light source to converge using a converting lens, illuminates a phosphor plate that rotates with the output light, and leads fluorescence that is emitted by the phosphor plate, to a light modulation element.

In many projection type display apparatuses including the apparatus disclosed in JP-A-2012-78488, an optical path changing element that causes one of the excitation light and the fluorescence to pass through and causes the other to be reflected is positioned in order not only to lead the excitation light to the phosphor plate, but also to lead the fluorescence that is emitted by the phosphor plate to the light modulation element. Specifically, a dichroic mirror in the shape of a flat plate is mostly positioned between the excitation light source and the phosphor plate.

In many light source devices including the device that was disclosed in JP-A-2012-78488, because the fluorescence that is emitted by the phosphor is diverging light, although passing through the converging lens, the fluorescence notably reaches the dichroic mirror while diverging. For this reason, an incident angle of the fluorescence is varied with a place of the dichroic mirror.

FIG. 12 is a diagram for illustrating this. In the light source device for the projection type display apparatus, a phosphor 3 is provided on a principal surface of a rotation plate 2 that rotates by a motor 1. Then, an excitation light source unit 4 is provided for the phosphor 3, and a laser light source that emits an excitation light Ex with a wavelength that possibly excites the phosphor 3 and an optical lens group for shaping the excitation light Ex are included in the excitation light source unit 4. A dichroic mirror 5 and a converging lens 6 are arranged between the excitation light source unit 4 and the phosphor 3. The converging lens 6 is a lens that not only causes the excitation light Ex to converge and causes the phosphor 3 to be illuminated with the excitation light Ex, but also causes fluorescence PL that is emitted by the phosphor 3 to converge and to be transferred to the dichroic mirror 5.

The dichroic mirror 5 is a mirror that causes the excitation light Ex from the excitation light source unit 4 to pass through in the direction of the phosphor 3, but reflects the fluorescence PL from the phosphor 3. The dichroic mirror 5 results from forming a dielectric multilayer film on a transparent glass having a shape of a flat plate.

In the light source in question, the converging lens 6 is positioned in such a manner that the shaped excitation light Ex that passes through the dichroic mirror 5 converges on the phosphor 3. However, because the fluorescence PL that is emitted by the phosphor 3 is emitted as diverging light at a wide angle, the fluorescence PL not only travels in reverse on a path for the excitation light Ex, but also travels toward the dichroic mirror 5, as light flux at a wider angle than the excitation light, by way of the converging lens 6. That is, in the fluorescence that is emitted by the phosphor 3, there is also a component that passes through the converging lens 6 along an optical path that is more outward than an optical path for the excitation light, and travels toward the dichroic mirror 5.

At this point, an incident angle of the fluorescence that is incident on the dichroic mirror 5 is studied with reference to FIGS. 12 and 13. Regarding the fluorescence PL, the principal light beam that passes along an optical axis of the converging lens, the fluorescence that passes the side that is the closest to the rotation center of the rotation plate 2, and the fluorescence that passes the side that is the remotest from the rotation center are PL0, PL1, and PL2, respectively. Incident angles at which principal light beam PL0, fluorescence PL1, and fluorescence PL2 are incident on the dichroic mirror 5 are defined as $\alpha 0$, $\alpha 1$, and $\alpha 2$, respectively. Moreover, the incident angle is an angle that a line normal to a mirror surface of the dichroic mirror 5 and incident fluorescence make with respect to each other. Furthermore, an angle of the fluorescence toward the dichroic mirror 5 after passing through the converging lens 6, that is, an angle that the fluorescence PL1 and fluorescence PL2 make with respect to each other is defined as $2 \times \theta$ (where $\theta$ is a converging half-angle).

If a direction of the dichroic mirror 5 is set in such a manner that an incident angle ($\alpha 0$) of the principal light beam PL0 is 45 degrees, and a numerical aperture (NA) of the converging lens 6 is set to be 0.174, as illustrated in FIG. 13, an incident angle ($\alpha 1$) of the fluorescence PL1 is 35 degrees, and an incident angle ($\alpha 2$) of the fluorescence PL2 is 55 degrees. Because $NA = \sin \theta$, the converging half-angle $\theta$ is equivalent to 10 degrees.

In this manner, there is a difference of 20 degrees in an incident angle to the dichroic mirror 5 between the fluorescence PL1 and the fluorescence PL2. When the incident angle to the dielectric multilayer film that is formed on a surface of the dichroic mirror 5 varies with the fluorescence, an optical path within the multilayer film varies and thus a difference occurs in transmission and reflection characteristics for the fluorescence. For this reason, the nonuniformity occurs to the fluorescence that is reflected by the dichroic mirror 5, and color irregularity or reduction in a light amount occurs that causes a problem to an image display apparatus.

Besides the example described above, in the case where an angle at which light that is used for illuminating the projection type display apparatus is incident on the dichroic mirror differs from place to place, the transmission and reflection characteristics become nonuniform, and the color irregularity or the reduction in the light amount is caused.

In order to suppress the color irregularity in question, it is also considered that a so-called wedge filter is provided, but this leads to an extremely high cost.

Accordingly, it is demanded to realize a light source device at a low cost, by which, when divergent illumination light for illuminating a projection type display apparatus is caused to be incident on a dichroic mirror, uniformity of the transmission and reflection characteristics is secured and color irregularity and reduction in the light amount are suppressed.

SUMMARY OF THE INVENTION

According to one aspect of the present invention, a light source device for a projection type display apparatus includes a phosphor, an excitation light source configured to output excitation light for exciting the phosphor, a surface-curved dichroic mirror having a curved surface and configured to cause one of excitation light from the excitation light source and fluorescence from the phosphor to pass through the curved surface and to cause the other to be reflected on the curved surface, and a converging lens positioned between the surface-curved dichroic mirror and the phosphor. The surface-curved dichroic mirror causes the light that passes through, neither to substantially converge, nor to substantially diverge, but performs a converging operation on the light that is reflected.

Further features of the present invention will become apparent from the following description of exemplary embodiments with reference to the attached drawings.

DESCRIPTION OF THE EMBODIMENTS

An embodiment of the present invention will be described below with reference to the drawings.

First Embodiment

A projection type display apparatus that includes a light source device according to a first embodiment of the present invention will be described with reference to FIG. 1. The light source device will be first described and then the entire projection type display apparatus will be described.

(Light Source Device)

In FIGS. 1, 101, 102, 103, 104, 105, 106, 107, and 108 depict a motor, a rotator, a phosphor, an excitation light source unit, a surface-curved dichroic mirror, a converging lens, a ¼-wavelength plate, and an excitation light source-side lens, respectively.

Figure 2A:
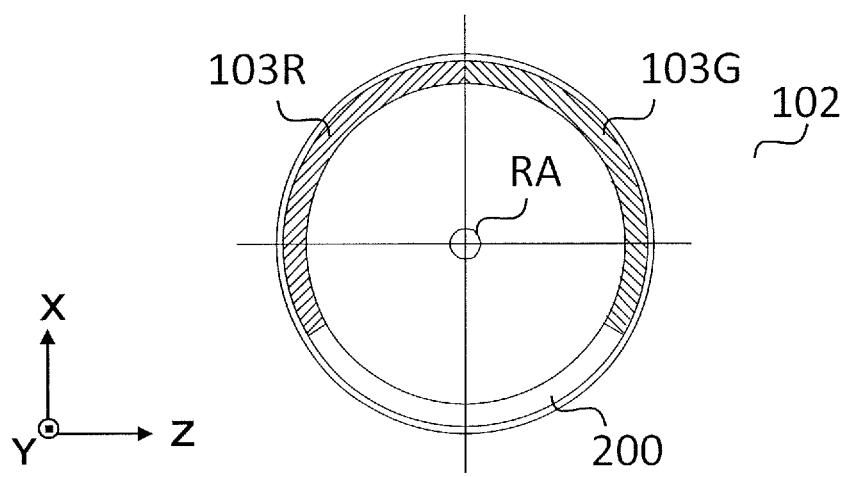
FIG. 2A is a plan-view diagram of a rotator according to the first embodiment.

In the apparatus, the phosphor 103 is provided on a principal surface of the rotator 102 that is rotatable by the motor 101. FIG. 2A is a plan-view diagram illustrating the rotator 102, when viewed from the converging lens 106 side. On the principal surface of the rotator 102, a red phosphor 103R and a green phosphor 103G that have different light emission wavelength characteristics are caused to cover a portion of a link area of which the center is a rotation shaft RA of the rotator 102. Then, in order to increase light extraction efficiency, a reflection surface for reflecting fluorescence that is radiated in the direction of the rotator 102, to the converging lens side is provided on a base of the link area on which the phosphor is provided.

Figure 3A:
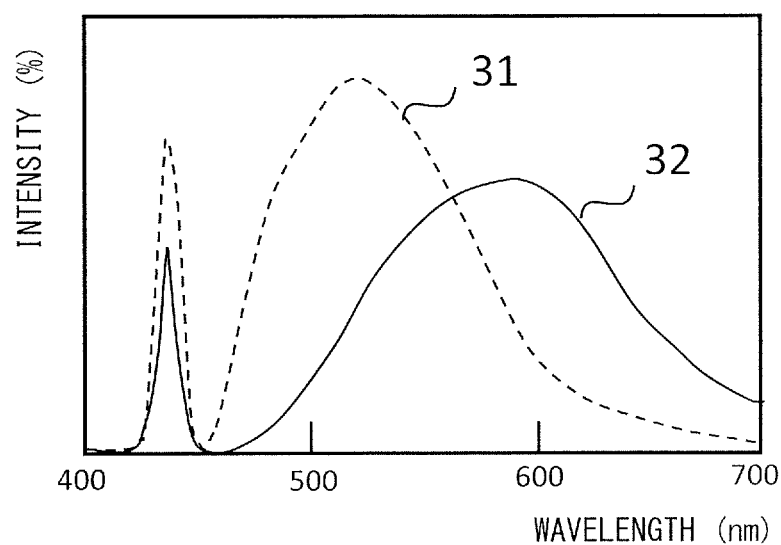
FIG. 3A is a graph illustrating a light emission spectrum according to the first embodiment.

FIG. 3A illustrates an example of a light emission spectrum when the red phosphor 103R and the green phosphor 103G are illuminated with excitation light. 31 that is indicated by a dotted line depicts a light emission spectrum of the green phosphor 103G and 32 that is indicated by a solid line is a light emission spectrum of the red phosphor 103R. Moreover, a peak that is shown in the vicinity of a wavelength of 445 nm is not for light emission by the phosphor and is for a portion of the excitation light that is reflected without being absorbed in the phosphor. Moreover, the phosphor to use may not be limited to an example of this light emission characteristic. For example, instead of phosphors for red light emission and green light emission, a phosphor for yellow light emission or white light emission may be provided.

In the present embodiment, as illustrated in FIG. 2A, a reflection portion 200 for reflecting excitation light is provided on a portion, not coated with phosphor, of the link area of the rotator 102. It is desirable that the reflection portion 200 is mirror-finished in such a manner as to reflect blue laser light with high efficiency.

Such a rotator 102 is caused to be rotated, and thus any one of the red phosphor 103R, the green phosphor 103G and the reflection portion 200 is illuminated with excitation light Ex. Regarding a base material of the rotator 102, there is also a case where a metal that has high thermal conductivity is suitably used in order to prevent phosphor from being overheated, or where a concave and convex portion or an empty hole for improving air cooling efficiency is provided.

Figure 3B:
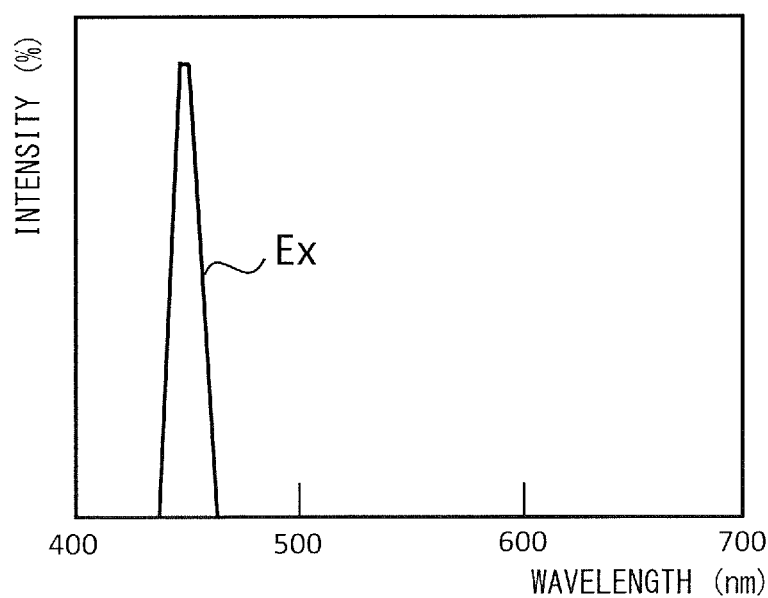
FIG. 3B is a graph illustrating a spectrum of excitation light according to the first embodiment.

An excitation light source unit 104 has a blue laser light source and an optical lens group for shaping excitation light (blue light). What is illustrated as Ex in FIG. 3B is an example of a spectrum of blue light that is not only suitable for exciting a phosphor, but is also usable as illumination light for the projection type display apparatus.

A module into which a plurality of blue laser light sources that are arranged in the form of an array and a plurality of collimate lenses that are arranged to correspond to the blue laser lights, respectively are integrally combined into a single piece is suitably used for the excitation light source unit 104. For example, a light emission element array in which blue laser light sources are arranged in a 2×4 matrix is included in each module. However, a scale of a matrix arrangement that is included in one module is not limited to this example. Larger scale of the matrix arrangement may be available and a matrix arrangement in which the number of laser light sources in a column and the number of laser light sources in a row are the same may be available. The blue laser light source, for example, is a semiconductor laser that emits light of which a wavelength is 445 nm. Light that is output from each laser source is emitted as almost parallel light beams from the excitation light source unit 104 due to operation of the lens.

The excitation light source-side lens 108, the surface-curved dichroic mirror 105, the ¼-wavelength plate 107, and the converging lens 106 are arranged between the excitation light source unit 104 and the rotator 102.

The excitation light source-side lens 108 transfers blue light that is P collimated polarization light, which is emitted from the excitation light source unit 104, in the direction of the surface-curved dichroic mirror 105 while the blue light is caused to be focused toward a focal point F1 of an elliptical surface that will be described.

The surface-curved dichroic mirror 105 causes the excitation light Ex, which is emitted by the excitation light source unit 104, to pass through toward the phosphor 103, but causes fluorescence, which is emitted by the red phosphor 103R and the green phosphor 103G to reflect on a concave surface thereof. Furthermore, the excitation light (the blue light) that is reflected on the reflection portion 200 of the rotator 102 passes through the ¼-wavelength plate 107 two times, one time before reflection and one time after reflection, and thus is converted into S polarization light, and then is incident on the surface-curved dichroic mirror 105, and is reflected on the concave surface thereof.

The surface-curved dichroic mirror 105 does not exert power for focusing or divergence on the light that passes through, but has power that causes the light that reflects on the concave surface to be focused. Moreover, the non-exertion of the power for focusing or divergence means that a focusing or divergence operation is not substantially performed except for turbulence of an optical path due to an error in manufacturing of the surface-curved dichroic mirror 105.

The surface-curved dichroic mirror 105 results from stacking a dielectric multilayer film on a transparent surface-curved substrate of which the thickness is fixed, apart from the error in the manufacturing. The dielectric multilayer film may be stacked on a concave surface-side surface of the surface-curved substrate, and may be stacked on a convex surface-side surface. The dielectric multilayer film may be stacked in such a manner that the thickness thereof is uniform on a curved surface, aside from an error in manufacturing.

Figure 4A:
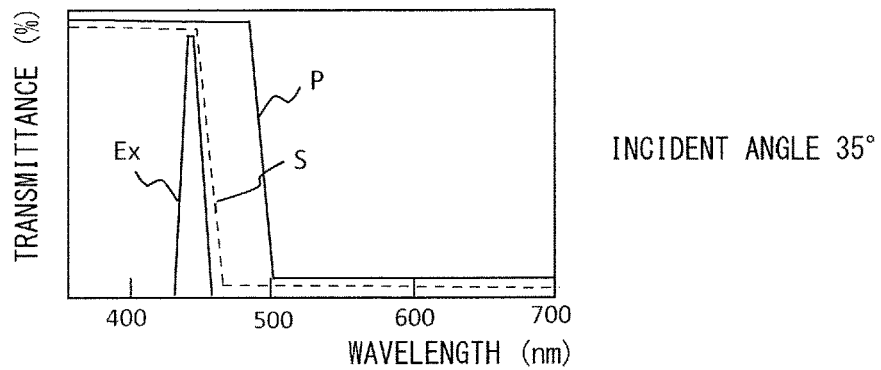
FIG. 4A is a graph illustrating a characteristic of a dichroic mirror according to the first embodiment, at an incident angle of 35 degrees.
Figure 4B:
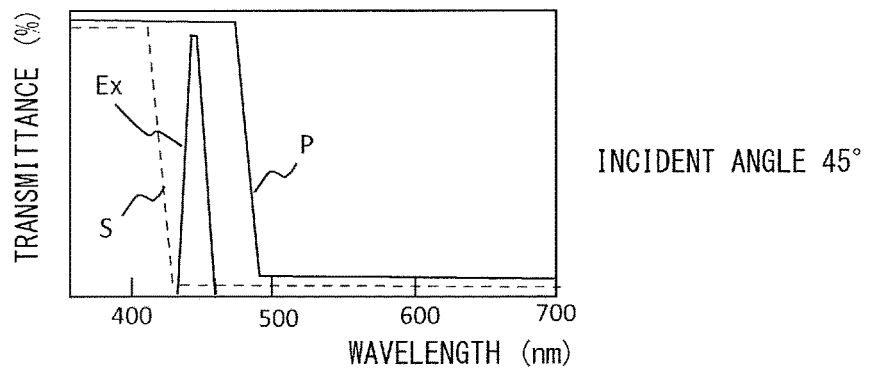
FIG. 4B is a graph illustrating a characteristic of the dichroic mirror according to the first embodiment, at an incident angle of 45 degrees.
Figure 4C:
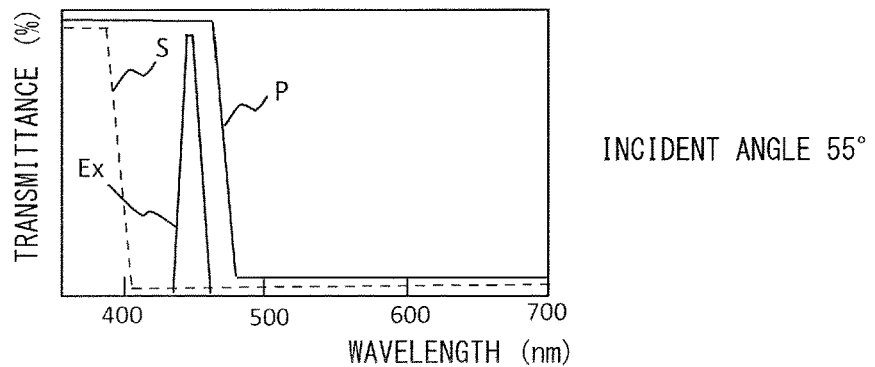
FIG. 4C is a graph illustrating a characteristic of the dichroic mirror according to the first embodiment, at an incident angle of 55 degrees.

Transmission and reflection characteristics of the surface-curved dichroic mirror 105 are illustrated in FIGS. 4A, 4B, and 4C. FIGS. 4A, 4B, and 4C are graphs illustrating the dependence of the transmission and reflection characteristics on a wavelength in the cases where incident angles are 35 degrees, 45 degrees, and 55 degrees, respectively. Moreover, the incident angle is an angle that a line normal to a mirror surface of the surface-curved dichroic mirror 105 and incident light make with respect to each other. The horizontal axis represents a wavelength of the incident light and the vertical axis represents a transmittance in the graph. It can be said that the lower the transmittance, the higher a reflectivity. In FIGS. 4A, 4B, and 4C, what is indicated by a solid line P is a graph showing characteristics of the P polarization light and what is indicated by a dotted line S is a graph showing characteristics of the S polarization light. Furthermore, for reference, a spectrum of the excitation light that is the P polarization light is expressed as Ex. As apparent from FIGS. 4A, 4B, and 4C, it is understood that, when an incident angle increases from 35 degrees up to 55 degrees, the transmission and reflection characteristics of the P polarization light and the S polarization light are shifted to the short wavelength side.

The light source device according to the embodiment will be further described with reference to the dependence of the transmission and reflection characteristics on the incident angle.

The excitation light Ex that is the P polarization light, which is emitted from the excitation light source unit 104, is incident on a convex surface side of the surface-curved dichroic mirror 105. However, as apparent from solid lines P in FIGS. 4A, 4B, and 4C, because the surface-curved dichroic mirror has a high transmittance within the wavelength region of the excitation light, the excitation light Ex passes through the surface-curved dichroic mirror 105 substantially without a loss.

Then, the excitation light travels by way of the ¼-wavelength plate 107, and then is caused by the converging lens 106 to converge on an upper surface of the rotator 102.

In a position where the excitation light Ex converges, green fluorescence of which a spectrum has a light emission characteristic 31 in FIG. 3A is caused to be emitted at a rotation timing at which the green phosphor 103G is present. In the same manner, red fluorescence of which a spectrum has a light emission characteristic 32 in FIG. 3A is caused to be emitted at a rotation timing at which the red phosphor 103R is present in a position where the excitation light Ex converges. Furthermore, the excitation light Ex (the blue light) is reflected at a rotation timing at which the reflection portion 200 is present in a position where the excitation light Ex converges.

The green fluorescence, the red fluorescence, and the reflected blue light are caused by the converging lens 106 to converge, and are incident on a concave surface side of the surface-curved dichroic mirror 105. Moreover, the blue light that is reflected on the reflection portion 200 travels again by way of the ¼-wavelength plate 107, and thus is converted in the S polarization light and is incident on the concave surface side of the surface-curved dichroic mirror 105.

In the surface-curved dichroic mirror 105, when a point on which a principal light beam that passes through an optical axis of the converging lens 106 is incident, a point on which a light beam that passes through the side which is the most closest to the rotation center of the rotator 102 is incident, and a point on which a light beam that passes through the side which is the most remotest from the rotation center is incident are defined as C, L, and U, respectively, incident angles at which the light beams are incident on the surface-curved dichroic mirror 105 are set to be $\alpha 0$, $\alpha 1$, and $\alpha 2$, respectively. Moreover, the incident angle is an angle that the line normal to the mirror surface of the surface-curved dichroic mirror 105 and the incident light make with respect to each other. Furthermore, a spreading angle of light flux that passes through the converging lens 106 and then travels toward the surface-curved dichroic mirror 105 is set to be $2\times\theta$ (where $\theta$ is a converging half-angle).

A shape and a direction of the surface-curved dichroic mirror 105 are set in such a manner that an incident angle ($\alpha 0$) of the principal light beam at the point C is 45 degrees, and a numerical aperture (NA) of the converging lens 106 is set to be 0.174. Because $NA=\sin\theta$, the converging half-angle $\theta$ is equivalent to 10 degrees. A reflection angle $\beta$ of the principal light beam is $2\times\alpha 0=90$ degrees. An illumination optical system of the projection type display apparatus that will be described below is positioned in this direction, i.e., a reflection direction of the principal light beam.

In the first embodiment, a portion of the elliptical surface, focal points of which are F1 and F2, is used as a shape of an optical surface of the surface-curved dichroic mirror 105. For example, a portion of the elliptical surface that has a ratio of a short axis (2×b) to a long axis (2×a) that is 70.7:100 is used, and the surface-curved dichroic mirror 105 is positioned in such a manner that the principal light beam at the point C and a short axis of an ellipse intersect. As an example, an elliptical surface (a=64.2 mm, b=45.4 mm, and an ellipticity ratio=70.7%) can be used. When a track of light flux of which a spreading angle is $2\times\theta$ is caused to follow, an arrangement relationship in which convergence to the one focal point F1 of the ellipse takes place is established. Each of a distance A from F1 to the point C and a distance B from F2 to the point C is set to be equal to a that is half of a long axis of the ellipse (A=B).

The shape and the arrangement described above are employed, and thus a difference between incident angles of fluorescence or reflection excitation light that are incident on each point on the surface-curved dichroic mirror 105 can be reduced. Specifically, $\alpha 0=45.0$ degrees, $\alpha 1=44.1$ degrees, $\alpha 2=44.1$ degrees. Suppression is possible in such a manner that a difference between $\alpha 0$, $\alpha 1$, and $\alpha 2$ is as small as 0.9 degrees. In an example of a planar dichroic mirror in the related art, which is described above, in the case of the converging lens with the same numerical aperture, because an angle difference between incident angles is as large as 20 degrees, compliance with the transmission and reflection characteristics in FIG. 4A or 4C takes place at some incident position, and thus color irregularity and loss in a light amount occurs to reflection light. However, in the present embodiment, because a difference between the incident angles depending on the incident position is reduced to a remarkable extent, it may be considered that generally, the green fluorescence, the red fluorescence, and the blue light that is the S polarization light comply with the transmission and reflection characteristics in FIG. 4B, without depending on the incident position. For this reason, the occurrence of the color irregularity and the loss in the light amount can be greatly reduced.

As apparent from a comparison between the light emission characteristic 31 of the green phosphor in FIG. 3A and the transmission and reflection characteristics in FIG. 4B, an S polarization light component of the green fluorescence that is incident on the surface-curved dichroic mirror 105 is almost all reflected and a P polarization component that has a wavelength of approximately 490 nm or more is mostly reflected. Furthermore, with regard to the red fluorescence, the S polarization light component and the P polarization component are almost all reflected as well. Furthermore, the blue light that is converted into the S polarization light is almost all reflected. That is, the high-efficiency use as the illumination light for the projection type display apparatus can be made.

The green fluorescence, the red fluorescence, and the S polarization blue light are reflected on the concave surface of the elliptical surface, and thus travel toward the focal point F2 in a focused manner. In the present embodiment, a convergent angle of reflection light flux is equal to a convergent angle $2\times\theta$ before reflection on the converging lens 106 side.

It can be said that the surface-curved dichroic mirror according to the present embodiment is a converging-type separation element that not only separates the optical paths for the excitation light that is the P polarization light and for the green fluorescence, but also performs a converging operation on the green fluorescence. Furthermore, it can also be said that the surface-curved dichroic mirror according to the present embodiment is a converging-type separation element that not only separates the optical paths for the excitation light that is the P polarization light and for the red fluorescence, but also performs the converging operation on the red fluorescence. Furthermore, it can also be said that the surface-curved dichroic mirror according to the present embodiment is a converging-type separation element that not only separates the optical paths for the excitation light that is the P polarization light and for the blue light that is the S polarization light, but also performs the converging operation on the blue light that is the S polarization light. The performance of the converging operation by the surface-curved dichroic mirror on the green fluorescence, the red fluorescence, and the blue light that is the S polarization light has an advantage in simplifying a configuration of a downstream relay lens 110.

Moreover, in the light source device according to the first embodiment, the red phosphor and the green phosphor are used, but colors other than the ones described above may be used according to a specification required for the light source device. If the transmission and reflection characteristics of the surface-curved dichroic mirror are suitably changed according to a combination of colors of the phosphors, the light source device that meets various specifications is possibly realized.

(Projection Type Display Apparatus)

Figure 1:
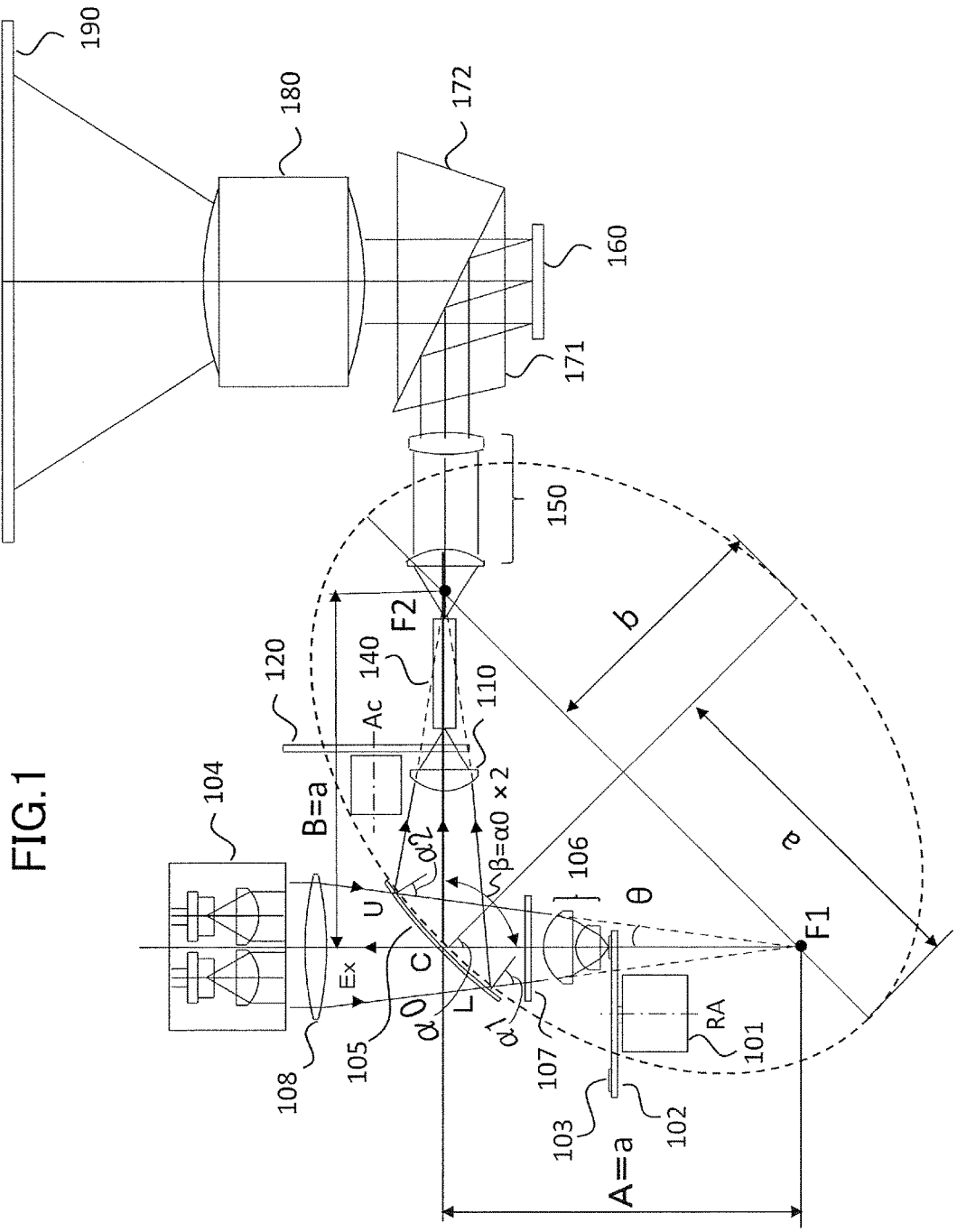
FIG. 1 is a diagram illustrating a configuration of a projection type display apparatus that includes a light source device according to a first embodiment.

The projection type display apparatus in FIG. 1 uses the light source device described above, as an illumination light source, and includes the relay lens 110, a color selection wheel 120, a light tunnel 140, an illumination lens 150, a light modulation device 160, a prism 171, a prism 172, and a projection lens 180. Additionally, in some cases, a projection screen 190 is included as well.

The relay lens 110 is a lens for setting light that is emitted by the light source device, to a prescribed NA that causes the light to be suitable for an F number of the projection lens 180, and causing the light to converge on an incident opening in the light tunnel 140. The relay lens does not have to be necessarily configured with one lens. Furthermore, in a case where NA is sufficient, the relay lens may not be provided.

The color selection wheel 120 is a plate-shaped rotator that is rotatable about a rotation shaft Ac. A color filter for each of R and G and a fan-shaped notch (a light transmission portion) for causing the blue light to pass through are provided on the color selection wheel 120. The color filter for each of the colors is provided to cut off an unnecessary wavelength region and increase color purity of display light. However, the blue light is laser light that has high color purity, and thus the filter does not need to be provided. Because of this, the light transmission portion is provided. According to a situation, in some cases, a diffusion plate is provided on the light transmission portion for causing NA of blue light to be consistent with NA of other color light. Moreover, in some cases, in order to improve brightness, a yellow (Y) phosphor area is provided in a portion of the rotator 102. However, in such cases, the light transmission portion for causing yellow (Y) fluorescence to pass through is provided on the color selection wheel 120.

The rotator 102 which is given the phosphor and the color selection wheel 120 are synchronized to each other and rotate. A rotation timing is adjusted in such a manner that when the red phosphor of the former emits light, when the green phosphor emits light, and when blue excitation light is reflected, an R filter, a G filter, and the light transmission portion, respectively, are positioned on the optical path. Moreover, in a case where light emission purity of the phosphor is sufficiently high, the color selection wheel may not be provided.

The illumination lens 150 is a lens that shapes light which propagates in the light tunnel 140 into light flux suitable for illuminating the light modulation device 160. The illumination lens 150 is configured with a single lens or a plurality of lenses.

The prism 171 and the prism 172 collectively constitute a TIR prism (an internal total reflection prism). The TIR prism causes internal total reflection to the illumination light, and causes the illumination light to be incident on the light modulation device 160 at a prescribed angle. Then, the TIR prism causes the reflection light, which results from the modulation in the light modulation device 160, to pass through toward the projection lens 180.

The light modulation device 160 is an element that modulates incident light based on an image signal, and uses a DMD in which micro mirror devices are provided in the form of an array. However, it is also possible that other reflection-type optical modulation devices, such as a reflection-type liquid crystal device, are used.

The projection lens 180 is a lens for projecting light that is modulated by the light modulation device 160, as an image. The illumination lens 150 is configured with a single lens or a plurality of lenses.

The projection screen 190 is used in a case where a rear projection-type display apparatus is configured. Furthermore, the projection screen 190 is mostly installed in the case of a front projection-type display apparatus, but does not necessarily need to be provided in a case where a user projects an image on any wall surface.

Next, entire operation of the projection type display apparatus will be described. The illumination light of which the color irregularity is suppressed, which is emitted from the light source device, travels by way of the relay lens 110, the color selection wheel 120, the light tunnel 140, and the illumination lens 150, and is incident on a prism of the TIR prism. The light that is reflected on a total reflection surface of the prism 171 is incident on the light modulation device 160 at a prescribed angle.

The light modulation device 160 has the micro mirror devices that are provided in the form of an array. The light modulation device 160 is caused to be synchronized for switching between colors of the illumination light, drives the micro mirror device according to each of the color component signal of the images, and causes image light to reflect at a prescribed angle toward the prism 171. The image light passes through the prism 171 and the prism 172, is led to the projection lens 180, and is projected on the projection screen 190.

The projection type display apparatus according to the present embodiment can illuminate a light modulation element using the good-quality light source device in which the color irregularity and the loss in the light amount are reduced. Because of this, it is possible that high-quality image display is performed at high brightness with less color irregularity.

Second Embodiment

In the first embodiment, with regard to the blue light for image display, the excitation light is caused to be reflected on the reflection portion 200 of the rotator 102, is converted into the S polarization light through the ¼-wavelength plate 107, and is caused to be reflected on the concave surface of the surface-curved dichroic mirror 105. In contrast, in a second embodiment, a transmission portion that causes the excitation light to pass through a portion of the rotator is provided without performing polarization conversion of the blue light for image display using the ¼-wavelength plate. The blue light that passes through is led to the convex surface side of the surface-curved dichroic mirror through the mirror and the converging lens, is caused to pass through the surface-curved dichroic mirror, and is caused to be incident on a projection optical system of the projection type display apparatus.

Figure 5:
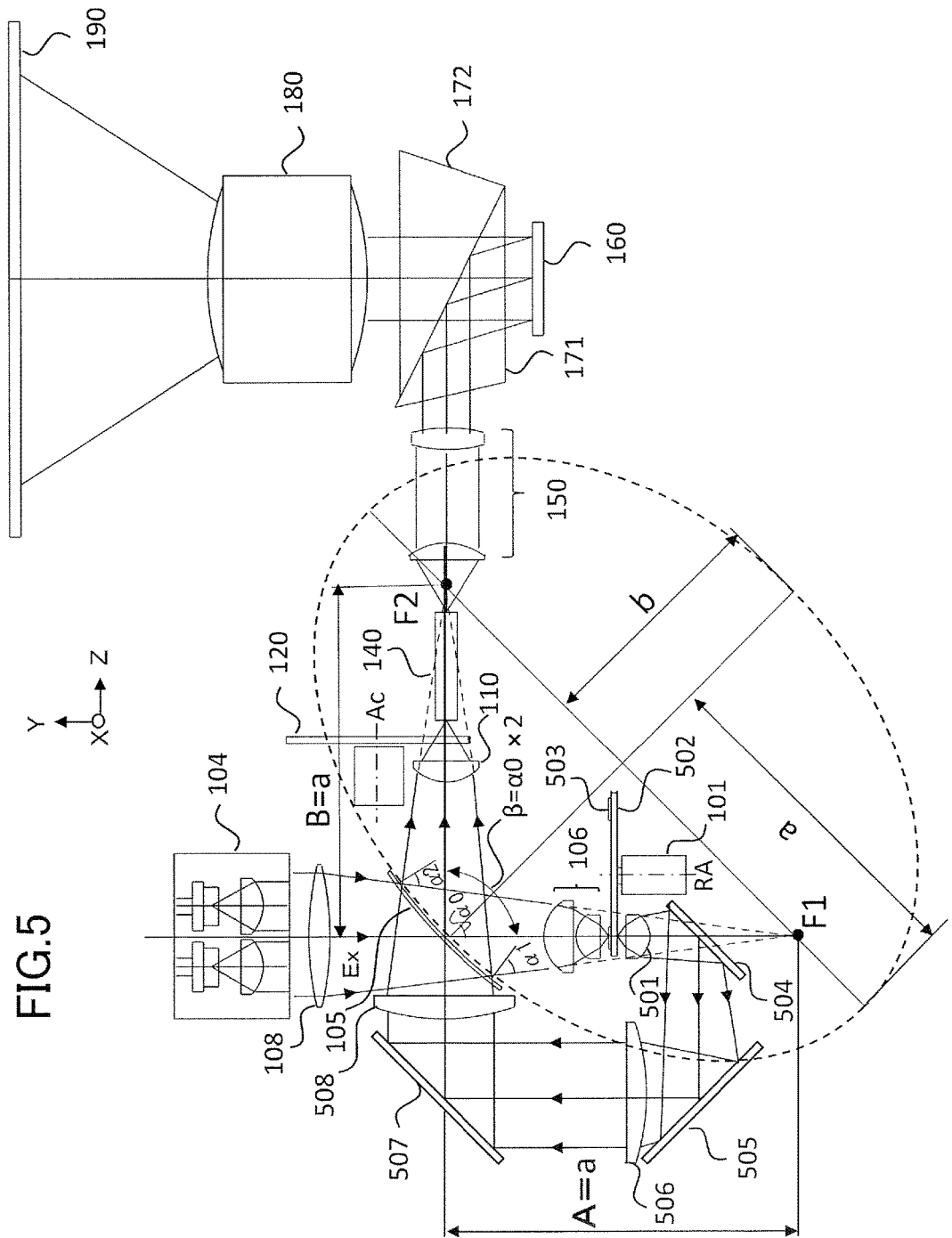
FIG. 5 is a diagram illustrating a configuration of a projection type display apparatus that includes a light source device according to the second embodiment.

A light source device and a projection type display apparatus according to the second embodiment will be described with reference to FIG. 5. In FIG. 5, the motor 101, the excitation light source unit 104, the surface-curved dichroic mirror 105, the converging lens 106, the excitation light source-side lens 108, the relay lens 110, the color selection wheel 120, the light tunnel 140, the illumination lens 150, the light modulation device 160, the prism 171, the prism 172, the projection lens 180, and the projection screen 190 have the same configurations as in the first embodiment, and thus descriptions thereof are omitted.

Figure 2B:
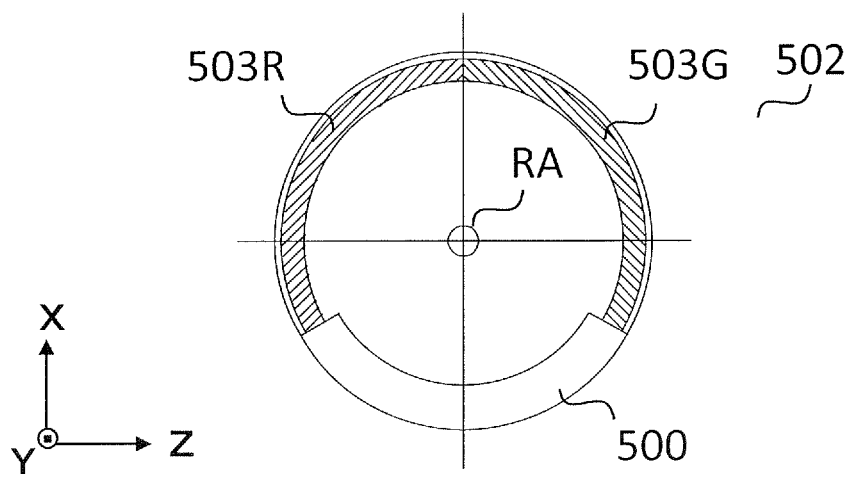
FIG. 2B is a plan-view diagram of a rotator according to a second embodiment.

A rotator 502 according to the second embodiment has a phosphor 503 on the principal surface thereof in the same manner as the rotator 102 according to the first embodiment, but partly has a different configuration. FIG. 2B is a plan-view diagram illustrating the rotator 502 according to the present embodiment, when viewed from the converging lens 106 side. On the principal surface of the rotator 502, a read phosphor 503R and a green phosphor 503G that have different light emission wavelength characteristics are formed on a portion of a link area of which the center is a rotation shaft RA of the rotator 502, and, in order to increase the efficiency of extraction of the fluorescence, a reflection surface is provided on a base of an area on which a phosphor is provided. In the first embodiment, the reflection portion 200 for reflecting the excitation light is provided within a portion of the link area of the rotator without being coated with the phosphor, but in the second embodiment, a transmission portion 500 for causing the excitation light to pass through is provided. The transmission portion 500 may have a configuration in which a transmissive material is used for this portion, and may have a structure in which a notch or an opening is provided in the rotator.

In the present embodiment, because the blue light for image display is output, at a rotation timing at which the transmission portion 500 is illuminated, the excitation light, as the P polarization light itself, passes through the transmission portion 500, and exits, as diverging light, to the rear side of the rotator, but converges on a converging lens 501. Then, the excitation light is reflected by a mirror 504, a mirror 505, and a mirror 507, and is led to the projection surface side of the surface-curved dichroic mirror 105. This blue light is the P polarization light, and thus passes through the surface-curved dichroic mirror 105, and travels toward the relay lens 110 of the illumination optical system.

The mirror 504, the mirror 505, and the mirror 507 are arranged in such a manner that a principal light beam of the blue light that passes through the surface-curved dichroic mirror 105 and travels toward the light tunnel 140 is consistent with a principal light beam of the fluorescence that is reflected on the concave surface of the surface-curved dichroic mirror 105 and travels toward the light tunnel 140.

Furthermore, characteristics of the converging lens 501, a converging lens 506, and a converging lens 508 are adjusted in such a manner that the blue light that passes through the surface-curved dichroic mirror 105 and travels toward the light tunnel 140, and the fluorescence that is reflected on the concave surface of the surface-curved dichroic mirror 105 and travels toward the light tunnel 140 have the same converging property. That is, the converging lens 106 and a concave surface mirror of the surface-curved dichroic mirror 105 exert focusing power on the fluorescence, but the characteristics of the converging lens 501, the converging lens 506, and the converging lens 508 are adjusted in such a manner as to be consistent with this. It is noted that at that time, the surface-curved dichroic mirror 105 does not exert the focusing power on the blue light that passes through from the convex surface side.

The projection type display apparatus according to the present embodiment can also illuminate the light modulation element using the good-quality light source device in which the color irregularity and the loss in the light amount are reduced. Because of this, it is possible that high-quality image display is performed at high brightness with less color irregularity.

Third Embodiment

Figure 6:
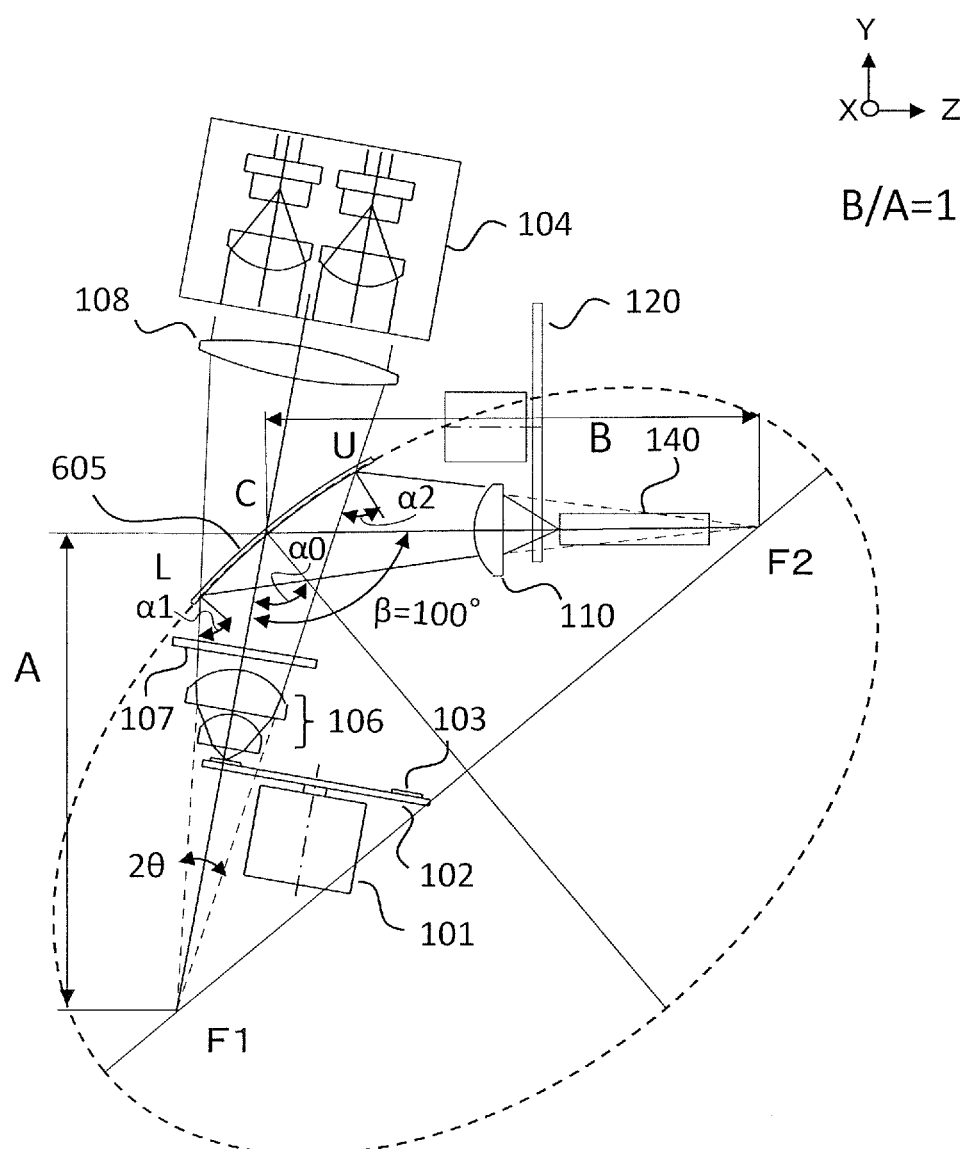
FIG. 6 is a light source device according to a third embodiment.

A third embodiment is illustrated as a modification example of the first embodiment in FIG. 6. In the same manner as the first embodiment, the third embodiment also includes the motor 101, the rotator 102, the phosphor 103, the excitation light source unit 104, the converging lens 106, the ¼-wavelength plate 107, the excitation light source-side lens 108, the relay lens 110, the color selection wheel 120, and the light tunnel 140. Furthermore, in the same manner, the illumination lens 150, the light modulation device 160, the prism 171, the prism 172, the projection lens 180, and the projection screen 190 that are illustrated in FIG. 1, are also included although illustrations thereof are omitted in FIG. 6. These individual constituent elements, unless particularly described, are assumed to have the same configurations as in the first embodiment.

Also in the third embodiment, the numerical aperture (NA) of the converging lens 106 is 0.174. Because NA=sin θ, the converging half-angle θ is equivalent to 10 degrees. In the first embodiment, the incident angle α0 of the principal light beam is set to 45 degrees, and the reflection angle β of the principal light beam is set to 2×α0=90 degrees. However, in the third embodiment, the incident angle α0 of the principal light beam is set to 50 degrees, and the reflection angle β of the principal light beam is set to 2×α0=100 degrees.

A shape of the surface-curved dichroic mirror 605 according to the third embodiment is different from the shape of the surface-curved dichroic mirror 105 according to the first embodiment. In the third embodiment, a portion of the elliptical surface, focal points of which are F1 and F2, is used as a shape of an optical surface of the surface-curved dichroic mirror 605. That is, the portion of the elliptical surface is a portion that has a ratio (an ellipticity ratio) of a short axis (2×b) to a long axis (2×a) is 64.3:100. The surface-curved dichroic mirror 605 is positioned in such a manner that the principal light beam at the point C and a short axis of an ellipse intersect. When the track of the light flux of which the spreading angle is 2×θ is caused to follow, the convergence to the one focal point F1 of ellipse takes place. Each of a distance A from F1 to the point C and a distance B from F2 to the point C is set to be equal to a that is half of a long axis of the ellipse (A=B).

The shape and the arrangement described above are employed, and thus the difference between the incident angles of the fluorescence or the reflection excitation light that is incident on each point on the surface-curved dichroic mirror 605 can be suppressed. Specifically, α0=50.0 degrees, α1=49.0 degrees, and α2=49.0 degrees. Suppression is possible in such a manner that a difference between α0, α1, and α2 is as small as 1.0 degree. In the example of the planar dichroic mirror in the related art, which is described above, in the case of the converging lens with the same numerical aperture, because the angle difference between the incident angles is as large as 20 degrees, the compliance with the transmission and reflection characteristics in FIG. 4A or 4C takes place due to the incident position, and thus the color irregularity occurs to the reflection light. However, in the present embodiment, because the difference between the incident angles depending on the incident position is reduced to a remarkable extent, it may be considered that generally, the green fluorescence, the red fluorescence, and the blue light that is the S polarization light comply with the transmission and reflection characteristics at approximately 50 degrees that is midway between the incident angles in FIGS. 4B and 4C, without depending on the incident position. For this reason, the occurrence of the color irregularity can be greatly reduced.

As apparent from a comparison between the light emission characteristic 31 of the green phosphor in FIG. 3A and the transmission and reflection characteristics in FIG. 4, the S polarization light component of the green fluorescence that is incident on the surface-curved dichroic mirror 605 is almost all reflected and the P polarization component that has a wavelength of 490 nm or more is mostly reflected. Furthermore, with regard to the red fluorescence, the S polarization light component and the P polarization component are almost all reflected as well. Furthermore, the blue light that is converted into the S polarization light is almost all reflected.

The green fluorescence, the red fluorescence, and the blue light that is the S polarization light, are reflected by the concave surface of the elliptical surface, and thus travel toward the focal point F2 in a focused manner.

That is, it can be said that the surface-curved dichroic mirror according to the present embodiment is the converging-type separation element that not only separates the optical paths for the excitation light that is the P polarization light and for the green fluorescence, but also performs the converging operation on the green fluorescence. Furthermore, it can also be said that the surface-curved dichroic mirror according to the present embodiment is a converging-type separation element that not only separates the optical paths for the excitation light that is the P polarization light and for the red fluorescence, but also performs the converging operation on the red fluorescence. Furthermore, it can also be said that the surface-curved dichroic mirror according to the present embodiment is a converging-type separation element that not only separates the optical paths for the excitation light that is the P polarization light and for the blue light that is the S polarization light, but also performs the converging operation on the blue light that is the S polarization light. The performance of the converging operation by the surface-curved dichroic mirror on the green fluorescence, the red fluorescence, and the blue light that is the S polarization light has an advantage in simplifying a configuration of a downstream relay lens 110.

Moreover, in the light source device according to the present embodiment, the red phosphor and the green phosphor are used, but colors other than the ones described above may be used according to a specification required for the light source device. As the transmission and reflection characteristics of the surface-curved dichroic mirror are suitably changed according to a combination of colors of the phosphors, the light source device that meets various specifications is possibly realized.

Fourth Embodiment

Figure 7:
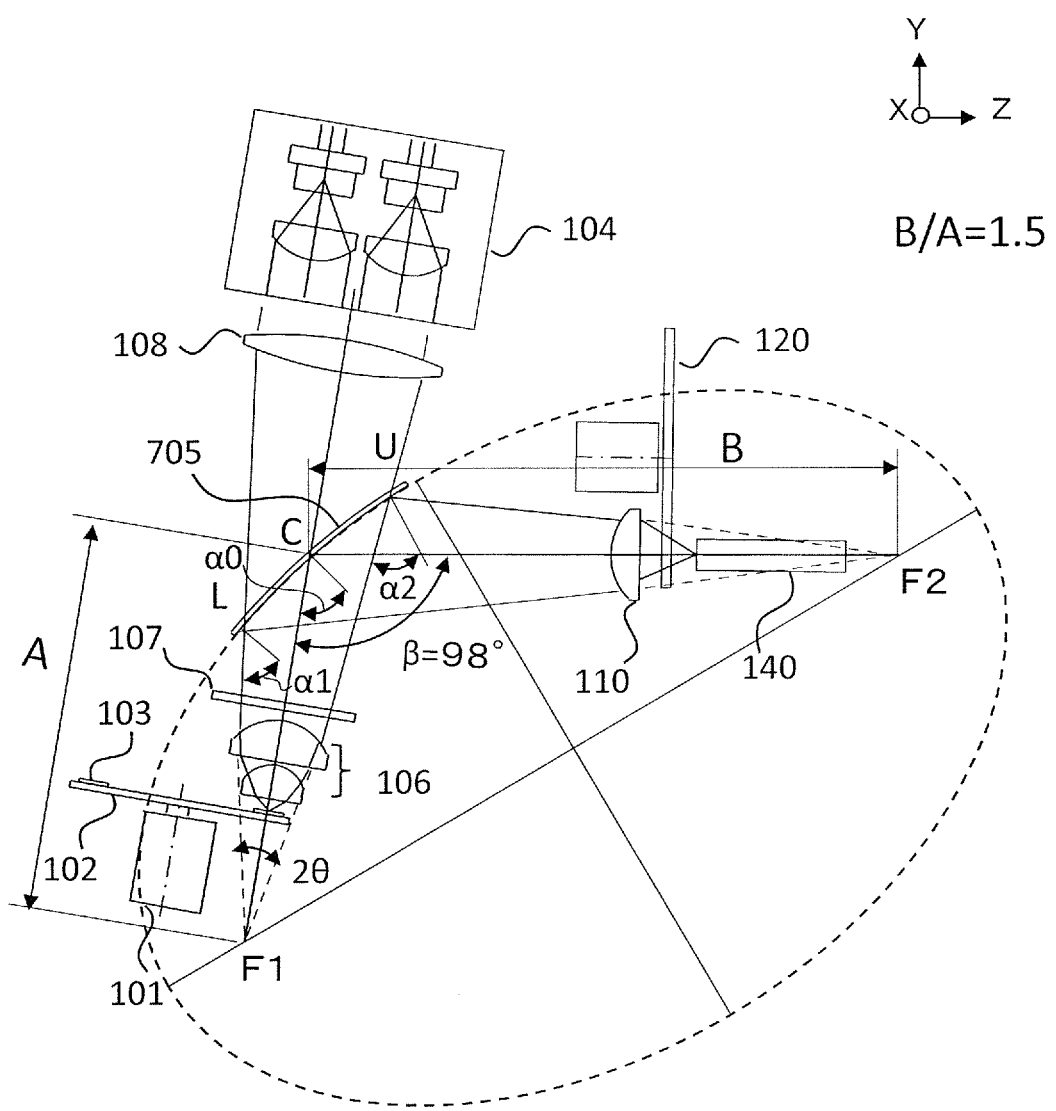
FIG. 7 is a light source device according to a fourth embodiment.

A fourth embodiment is illustrated as a modification example of the first embodiment in FIG. 7. In the same manner as the first embodiment, the fourth embodiment includes the motor 101, the rotator 102, the phosphor 103, the excitation light source unit 104, the converging lens 106, the ¼-wavelength plate 107, the excitation light source-side lens 108, the relay lens 110, the color selection wheel 120, and the light tunnel 140. Furthermore, in the same manner, the illumination lens 150, the light modulation device 160, the prism 171, the prism 172, the projection lens 180, and the projection screen 190 that are illustrated in FIG. 1 are also included although illustrations thereof are omitted in FIG. 7. These individual constituent elements, unless particularly described, are assumed to have the same configurations as in the first embodiment.

Also in the fourth embodiment, the numerical aperture (NA) of the converging lens 106 is 0.174. Because NA=sin θ, the converging half-angle θ is equivalent to 10 degrees. In the first embodiment, the incident angle α0 of the principal light beam is set to 45 degrees, and the reflection angle β of the principal light beam is set to 2×α0=90 degrees. However, in the fourth embodiment, the incident angle α0 of the principal light beam is set to 44 degrees, and the reflection angle β of the principal light beam is set to 2×α0=98 degrees.

A portion of the elliptical surface, focal points of which are F1 and F2, and which has a ratio (an ellipticity ratio) of a short axis (2×b) to a long axis (2×a) that is 64.3:100 is used as a shape of an optical surface of the surface-curved dichroic mirror 705 according to the fourth embodiment, as is the case with the surface-curved dichroic mirror 605 according to the third embodiment. However, while a curved surface in the vicinity of a portion that intersects the short axis of the elliptical surface is used in the third embodiment, an elliptical surface of a portion that has a smaller curvature radius in the direction of the short axis, which is located at a distance from the short axis, is used in the fourth embodiment. Accordingly, in the fourth embodiment, the point C at which the principal light beam of the converging lens 106 and the surface-curved dichroic mirror 605 intersect is a position that is located at a distance from the short axis of the ellipse.

When the track of the light flux of which the spreading angle is 2×θ is caused to follow, the convergence to the one focal point F1 of ellipse takes place. The distance A from F1 to the point C and the distance B from F2 to the point C are set such that B/A=1.5. That is, an area of the elliptical surface, which has a smaller curvature radius than in the first embodiment, is used. In this case, because a distance between the surface-curved dichroic mirror 705 and the color selection wheel 120 can be increased, the use as a configuration suitable for the case where it is desired that the distance B is increased for the reason, such as a limit of a product layout can be made.

The shape and the arrangement described above are employed, and thus the difference between the incident angles of the fluorescence or the reflection excitation light that is incident on each point on the surface-curved dichroic mirror 705 can be reduced. Specifically, α0=49.1 degrees, α1=47.1 degrees, and α2=50.0 degrees. Suppression is possible in such a manner that a difference between α0, α1, and α2 is as small as 2.9 degrees. In the example of the planar dichroic mirror in the related art, which is described above, in the case of the converging lens with the same numerical aperture, because the angle difference between the incident angles is as large as 20 degrees, the compliance with the transmission and reflection characteristics in FIG. 4A or 4C takes place depending on the incident position, and thus the color irregularity occurs to the reflection light. However, in the present embodiment, because the difference between the incident angles depending on the incident position is reduced to a remarkable extent, it may be considered that generally, the green fluorescence, the red fluorescence, and the blue light that is the S polarization light comply with the transmission and reflection characteristics at 49 degrees that is midway between the incident angles in FIGS. 4B and 4C, without depending on the incident position. For this reason, the occurrence of the color irregularity or the loss in the light amount can be greatly reduced.

As apparent from the comparison between the light emission characteristic 31 of the green phosphor in FIG. 3A and the transmission and reflection characteristics in FIG. 4B, the S polarization light component of the green fluorescence that is incident on the surface-curved dichroic mirror 705 is almost all reflected and the P polarization component that has a wavelength of 490 nm or more is mostly reflected. Furthermore, with regard to the red fluorescence, the S polarization light component and the P polarization component are almost all reflected as well. Furthermore, the blue light that is converted into the S polarization light is almost all reflected.

The green fluorescence, the red fluorescence, and the blue light that is the S polarization light are reflected by the concave surface of the elliptical surface, and thus travel toward the focal point F2 in a focused manner.

That is, it can be said that the surface-curved dichroic mirror according to the present embodiment is the converging-type separation element that not only separates the optical paths for the excitation light that is the P polarization light and for the green fluorescence, but also performs the converging operation on the green fluorescence. Furthermore, it can also be said that the surface-curved dichroic mirror according to the present embodiment is a converging-type separation element that not only separates the optical paths for the excitation light that is the P polarization light and for the red fluorescence, but also performs the converging operation on the red fluorescence. Furthermore, it can also be said that the surface-curved dichroic mirror according to the present embodiment is a converging-type separation element that not only separates the optical paths for the excitation light that is the P polarization light and for the blue light that is the S polarization light, but also performs the converging operation on the blue light that is the S polarization light. The performance of the converging operation by the surface-curved dichroic mirror on the green fluorescence, the red fluorescence, and the blue light that is the S polarization light has an advantage in simplifying a configuration of a downstream relay lens 110.

Moreover, in the light source device according to the present embodiment, the red phosphor and the green phosphor are used, but colors other than the ones described above may be used according to a specification required for the light source device. As the transmission and reflection characteristics of the surface-curved dichroic mirror are suitably changed according to a combination of colors of the phosphors, the light source device that meets various specifications is possibly realized.

Fifth Embodiment

Figure 8:
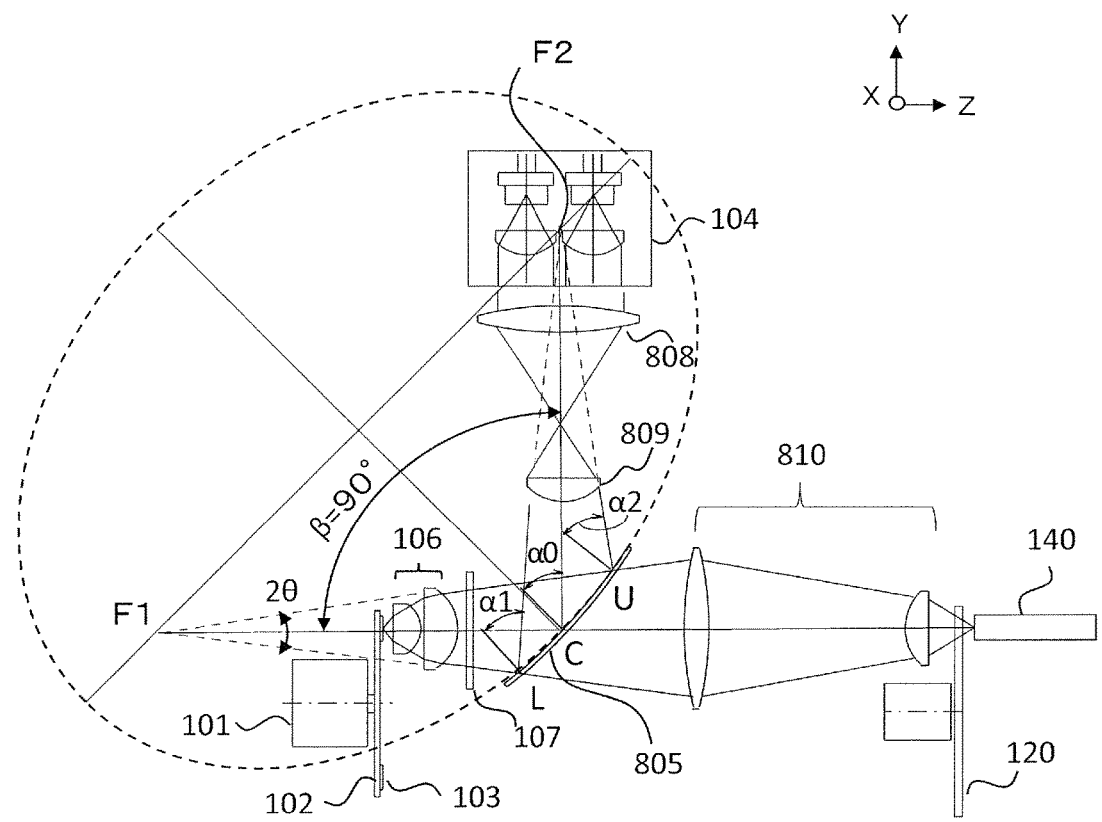
FIG. 8 is a light source device according to a fifth embodiment.

FIG. 8 illustrates a fifth embodiment. In the first to fourth embodiments, the fluorescence from the rotator is led to the direction of the relay lens while being caused to be reflected on the concave surface of the surface-curved dichroic mirror and thus converging. However, in the fifth embodiment, the excitation light is lead to the rotator while being caused to be reflected on the concave surface of the surface-curved dichroic mirror and thus converging.

In the same manner as the first embodiment, the fifth embodiment also includes the motor 101, the rotator 102, the phosphor 103, the excitation light source unit 104, the converging lens 106, the ¼-wavelength plate 107, the color selection wheel 120, and the light tunnel 140. Furthermore, in the same manner, the illumination lens 150, the light modulation device 160, the prism 171, the prism 172, the projection lens 180, and the projection screen 190, which are illustrated in FIG. 1, are also included although illustrations thereof are omitted in FIG. 8. These individual constituent elements, unless particularly described, are assumed to have the same configurations as in the first embodiment.

In the fifth embodiment, as illustrated in FIG. 2A, the rotator 102 has the red phosphor, the green phosphor, and the reflection portion. Furthermore, the numerical aperture (NA) of the converging lens 106 is 0.174. Because NA=sin θ, the converging half-angle θ is equivalent to 10 degrees.

In the present embodiment, a blue light source of the S polarization light is used as the excitation light source unit 104. Two excitation light source side lenses 808 and 809 are provided between the excitation light source unit 104 and a surface-curved dichroic mirror 805. The excitation light beams are caused to temporarily converge and intersect between the two lenses, and are caused to be incident, as diverging light, on a concave surface of the surface-curved dichroic mirror 805.

Figure 9A:
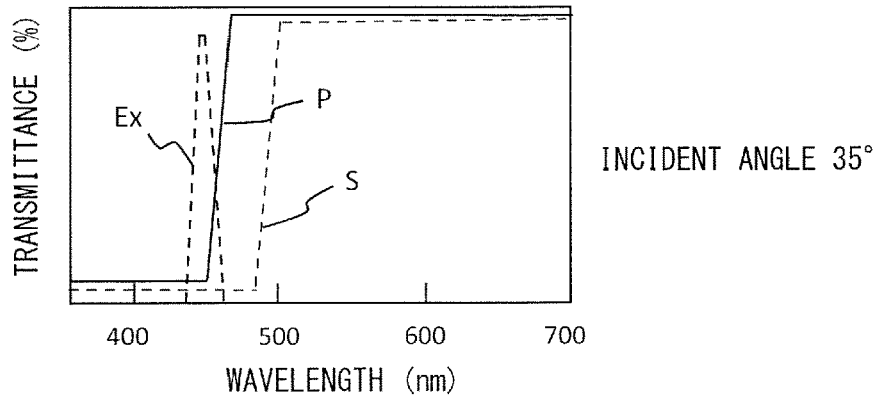
FIG. 9A is a graph illustrating a characteristic of a dichroic mirror according to the fifth embodiment, at an incident angle of 35 degrees.
Figure 9B:
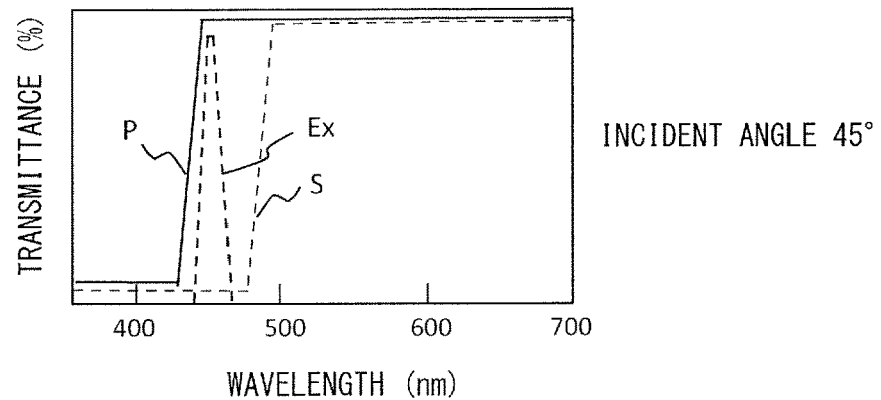
FIG. 9B is a graph illustrating a characteristic of the dichroic mirror according to the fifth embodiment, at an incident angle of 45 degrees.
Figure 9C:
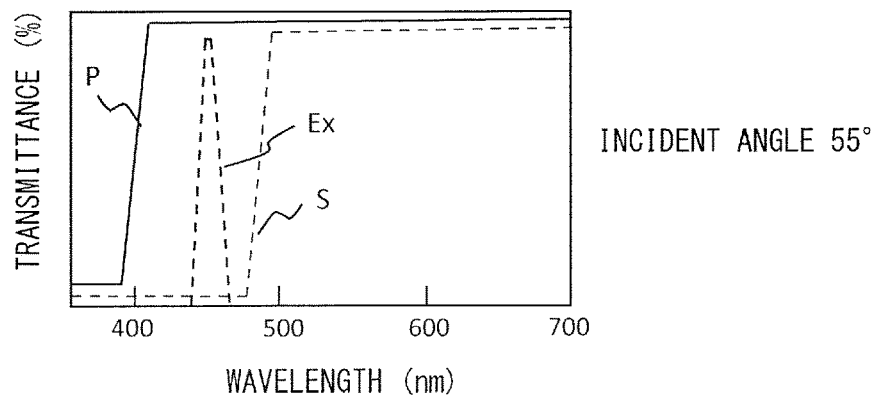
FIG. 9C is a graph illustrating a characteristic of the dichroic mirror according to the fifth embodiment, at an incident angle of 55 degrees.

The transmission and reflection characteristics of the surface-curved dichroic mirror 805 according to the present embodiment are illustrated in FIGS. 9A, 9B, and 9C. FIGS. 9A, 9B, and 9C are graphs illustrating the dependence of the transmission and reflection characteristics on a wavelength in the cases where incident angles are 35 degrees, 45 degrees, and 55 degrees, respectively. Moreover, the incident angle is an angle that a line normal to a mirror surface of the surface-curved dichroic mirror 805 and incident light make with respect to each other. The horizontal axis represents a wavelength of the incident light and the vertical axis represents a transmittance in the graph. It can be said that the lower the transmittance, the higher a reflectivity. In FIGS. 9A, 9B, and 9C, what is indicated by a solid line P is a graph showing characteristics of the P polarization light and what is indicated by a dotted line S is a graph showing characteristics of the S polarization light. Furthermore, for reference, a spectrum of the excitation light that is the S polarization light is expressed as Ex. As apparent from FIGS. 9A, 9B, and 9C, it is understood that, when the incident angle increases from 35 degrees up to 55 degrees, particularly, the transmission and reflection characteristics of the P polarization light are shifted to the short wavelength side. The embodiment will be further described with reference to the dependence of the transmission and reflection characteristics on the incident angle.

The excitation light Ex that is the S polarization light, which is emitted from the excitation light source unit 104, is incident on the concave surface side of the surface-curved dichroic mirror 805. However, as apparent from dotted lines S in FIGS. 9A, 9B, and 9C, because the surface-curved dichroic mirror has a high transmittance within the wavelength region of the excitation light, the excitation light Ex is reflected in the direction of the rotator without almost a loss.

Then, the excitation light travels by way of the ¼-wavelength plate 107, and then is caused by the converging lens 106 to converge on the upper surface of the rotator 102.

The green fluorescence of which the spectrum has the light emission characteristic 31 in FIG. 3A is caused to be emitted at a rotation timing at which the green phosphor 103G is positioned at a converging point for the excitation light Ex. In the same manner, the red fluorescence of which the spectrum has the light emission characteristic 32 in FIG. 3A is caused to be emitted at a rotation timing at which the red phosphor 103R is positioned at a converging point for the excitation light Ex. Furthermore, at a rotation timing at which the reflection portion 200 is positioned at a converging point for the excitation light Ex, the excitation light Ex (the blue light) is reflected, again travels by the ¼-wavelength plate 107, and thus is converted into the P polarization light.

The green fluorescence, the red fluorescence, and the reflected excitation light are caused by the converging lens 106 to converge, and are incident on the concave surface side of the surface-curved dichroic mirror 105.

When the point on which the principal light beam that passes through the optical axis of the converging lens 106 is incident, the point on which the light beam that passes through the side which is the most closest to the rotation center of the rotator 102 is incident, and the point on which the light beam that passes through the side which is the most remotest from the rotation center is incident are defined as C, L, and U, respectively, incident angles at which the light beams are incident on the surface-curved dichroic mirror 805 are set to be α0, α1, and α2, respectively. Moreover, the incident angle is an angle that the line normal to a mirror surface of the surface-curved dichroic mirror 805 and the incident light make with respect to each other. Furthermore, the spreading angle of the light flux that passes through the converging lens 106 and then travels toward the surface-curved dichroic mirror 805 is set to be 2×θ (where θ is a converging half-angle).

The shape and the direction of the surface-curved dichroic mirror 805 are set in such a manner that an incident angle (α0) of the principal light beam at the point C is 45 degrees, and the numerical aperture (NA) of the converging lens 106 is set to be 0.174. Because NA=sin θ, the converging half-angle θ is equivalent to 10 degrees.

The reflection angle β of the principal light beam of the excitation light is 2×α0=90 degrees. The green fluorescence, the red fluorescence, and the reflected excitation light, which travel along the optical axis of the converging lens 106, pass through the point C and travel straight, and the illumination optical system of the projection type display apparatus is positioned in this straight traveling direction.

In the present embodiment, a portion of the elliptical surface, focal points of which are F1 and F2, is used as the shape of the optical surface of the surface-curved dichroic mirror 805. Specifically, a portion of the elliptical surface having a ratio (an ellipticity ratio) of a short axis (2×b) to a long axis (2×a) of 70.7:100 is used, and the surface-curved dichroic mirror 805 is positioned in such a manner that the principal light beam at the point C and the short axis of the ellipse intersect. When the track of the light flux of which the spreading angle is 2×θ is caused to follow, focusing at the one focal point F1 of ellipse takes place. Furthermore, a track of light flux of the excitation light is caused to follow, focusing at the other focal point F2 takes place.

By adopting such a shape and arrangement, the incident angles of the excitation light, the fluorescence, or the reflected excitation light incident on each point of the curved dichroic mirror 805 can be made close to each other.

As apparent from FIGS. 9A, 9B, and 9C, when the incident angle increases from 35 degrees up to 55 degrees, the surface-curved dichroic mirror 805 according to the present embodiment shifts particularly the transmission and reflection characteristics of the P polarization light to the short wavelength side. Therefore, when the incident angle of the blue light for illumination, which is reflected on the reflection portion 200 of the rotator 102, and is converted by the ¼-wavelength plate 107 into the P polarization light, differs greatly at each point on the diachronic mirror, because the transmittance differs from place to place, the illuminance unevenness occurs to blue illumination light.

However, in the present embodiment, the difference between the incident angels at each point can be reduced using the surface-curved dichroic mirror 805 that has the elliptical surface, it is also possible to emit illumination light which has high uniformity.

That is, it can be said that the surface-curved dichroic mirror 805 according to the present embodiment is a converging-type separation element which not only separates the optical paths for the excitation light that is the S polarization light, the green fluorescence, and the P polarization, but also performs the converging operation on the excitation light that is the S polarization light. Moreover, because the green fluorescence, the red fluorescence, and the blue light that is the P polarization light are output as the diverging light, power of a downstream relay lens 810 may set to be stronger than in the first embodiment.

Moreover, in the light source device according to the fifth embodiment, the red phosphor and the green phosphor are used, but color other than the one described above may be used according to a specification required for the light source device. If the transmission and reflection characteristics of the surface-curved dichroic mirror are suitably changed according to a combination of colors of the phosphors, the light source device that meets various specifications is possibly realized.

Sixth Embodiment

Figure 10:
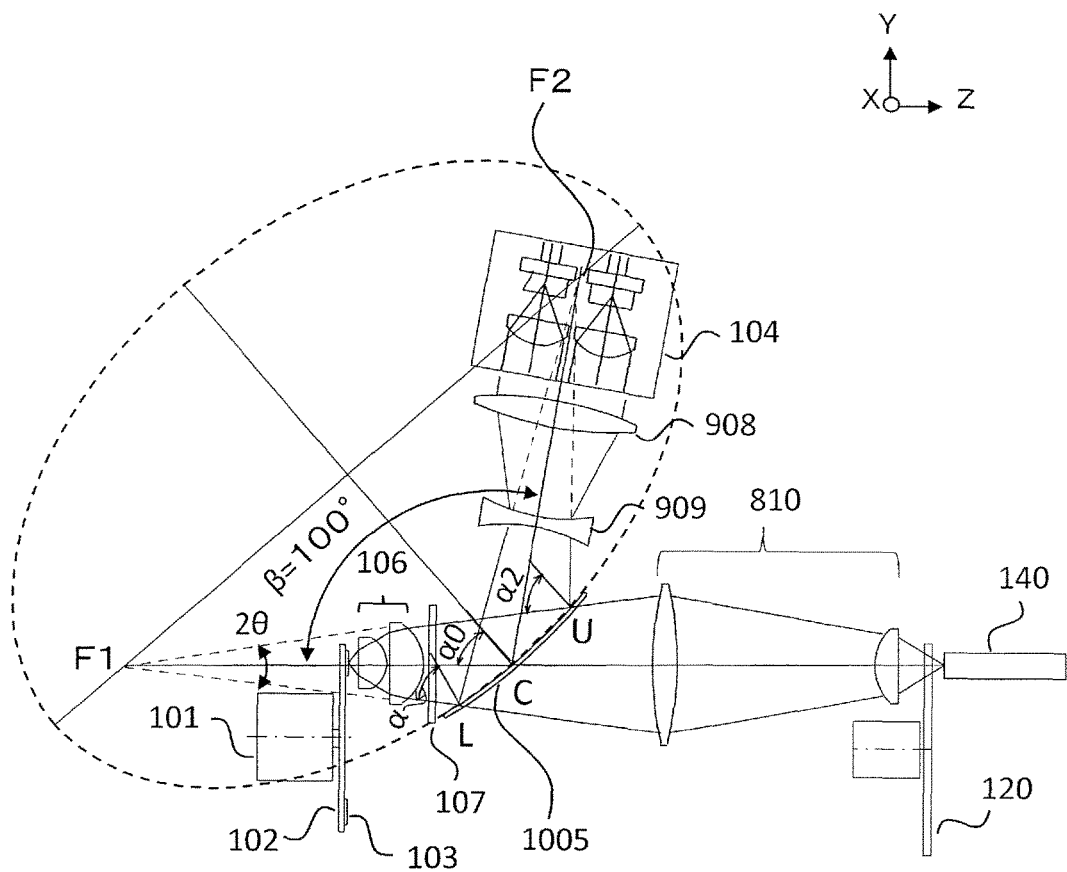
FIG. 10 is a diagram illustrating a light source device according to a sixth embodiment.

A sixth embodiment is illustrated as a modification example of the fifth embodiment in FIG. 10.

A point of a modification to the fifth embodiment is that the shape of the elliptical surface is changed in such a manner that the reflection angle θ of the principal light beam of the excitation light is 100 degrees and that a lens configuration on the excitation light source side is changed to provide a set of a convex lens 908 and a concave lens 909.

In the present embodiment, the difference between the incident angels at each point can be reduced using the surface-curved dichroic mirror 1005 that has the elliptical surface, it is also possible to emit illumination light which has high uniformity.

Other Embodiment 1

In the light source device for the projection type display apparatus according to the present invention, the shape or the positioning of the elliptic mirror that is used as the surface-curved dichroic mirror is not limited to those examples in the description. When the numerical aperture of the converging lens is set to be 0.174 and θ=10°, the incident angles α1, α0, and α2, and the incident angle difference in a case where the shape or the positioning is changed are illustrated in Table 1.

TABLE 1

| ELLIPTICITY RATIO b/a | 76.0% | | | 70.7% | | | 64.3% | | |
|---|---|---|---|---|---|---|---|---|---|
| REFLECTION ANGLE β | 80 | 78.71 | 75.67 | 90 | 88 | 84.5 | 100 | 98.28 | 94.16 |
| B/A RATIO | 1 | 1.312 | 1.667 | 1 | 1.365 | 1.786 | 1 | 1.458 | 1.987 |
| α1 | 39.2 | 37.8 | 35.4 | 44.1 | 42.3 | 39.7 | 49.0 | 47.1 | 44.3 |
| α0 | 40.0 | 39.4 | 37.8 | 45.0 | 44.0 | 42.3 | 50.0 | 49.1 | 47.1 |
| α2 | 39.2 | 40.0 | 39.4 | 44.1 | 45.0 | 44.1 | 49.0 | 50.0 | 49.1 |

TABLE 1-continued

| ELLIPTICITY RATIO b/a | | 76.0% | | | 70.7% | | | 64.3% | |
|---|---|---|---|---|---|---|---|---|---|
| INCIDENT ANGLE DIFFERENCE | 0.8 | 2.2 | 3.9 | 0.9 | 2.7 | 4.3 | 1.0 | 2.9 | 4.9 |

In Table 1, an ellipticity ratio is a ratio of a long axis a and a short axis b of the elliptical surface, β is a reflection angle of the principal light beam, and B/A is a parameter that defines an area which is used as a mirror surface in the shape of an elliptical surface. Moreover, A is a distance between the converging lens 106 side focal point F1 of the two focal points of the elliptical surface, and the point C at which the optical axis of the converging lens 106 intersects the mirror surface. Moreover, B is a distance between the relay lens 110 side focal point F2 of the two focal points of the elliptical surface, and the point C at which the optical axis of the relay lens 110 intersects the mirror surface.

In Table 1, an incident angle difference is a maximum of 4.9 degrees, and is half or less of a light flux half-angle θ. Furthermore, it is preferable that a reflection angle β of the principal light beam is equal to or greater than 80 degrees and is equal to or smaller than 120 degrees, including the example in Table 1. Furthermore, in a case where the incident angle difference is particularly reduced, B/A may be set to be equal to or greater than 0.75 and to be equal to or smaller than 2.0, but, desirably, may be set to be equal to or greater than 0.75 and to be equal to or smaller than 1.5. Furthermore, it is desirable that NA (=sine θ) of light flux that is incident on the concave surface is set to be in a range from 0.1 to 0.5.

Furthermore, the numerical aperture (NA) of the converging lens is not necessarily set to 0.174 that is given as an example, and can be suitably changed, but is preferably set in such a manner that the difference between the incident angle to the surface-curved dichroic mirror is half or less of the light flux half-angle θ.

Other Embodiment 2

Figure 11A:
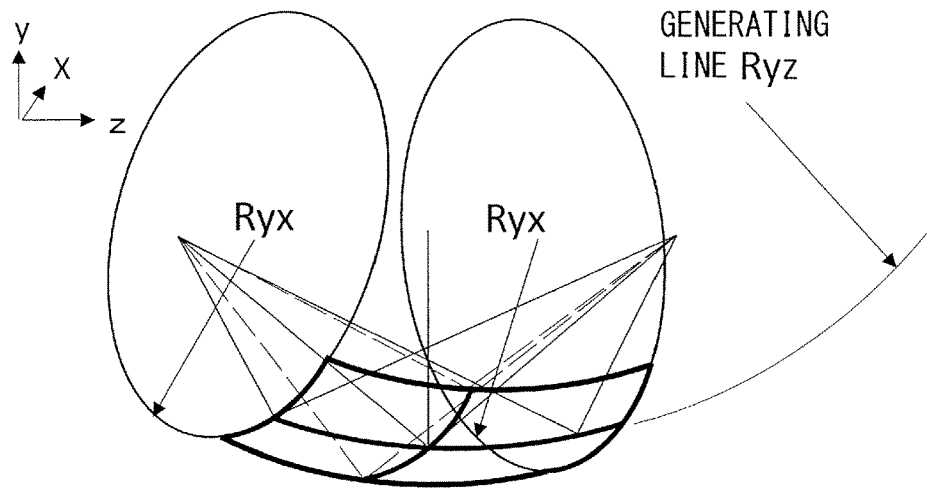
FIG. 11A is a perspective diagram illustrating a toroidal surface that is a curved surface according to another embodiment.

The light source device for the projection type display apparatus according to the present invention, a shape of a curved surface of the surface-curved dichroic mirror may not be a surface that is elliptical in the strict sense, and for example, may be similar to a toroidal surface. An example of the toroidal surface is illustrated in FIG. 11A. A surface shape that is configured when an arc with a radius Ryx within a YX plane is moved along an arc with a radius Ryz within a YZ plane may be employed as a curved surface shape of the surface-curved dichroic mirror (Ryx<Ryz).

Figure 11B:
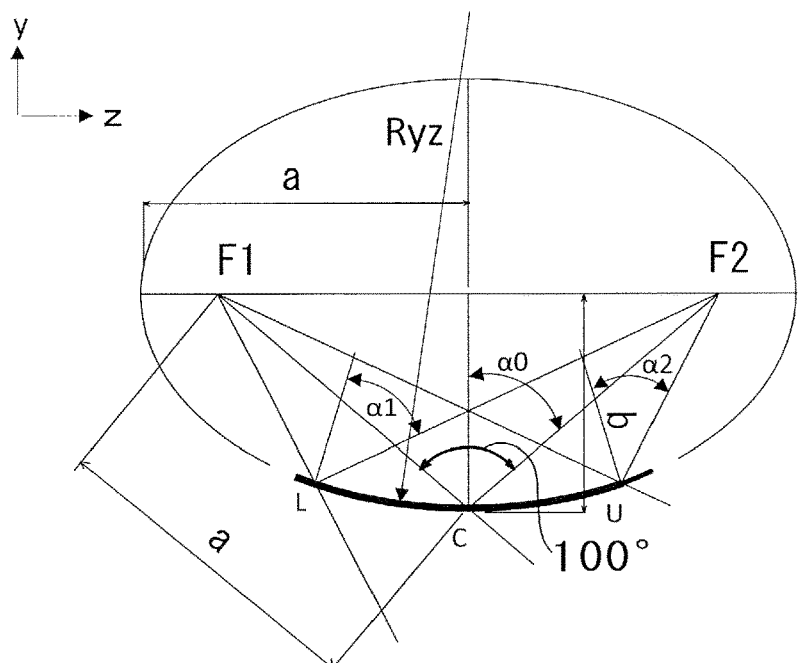
FIG. 11B is a diagram illustrating an YZ cross section of the toroidal surface.
Figure 11C:
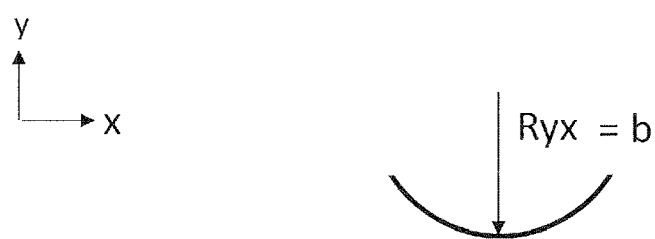
FIG. 11C is a diagram illustrating a XY cross section of the toroidal surface.
Figure 12:
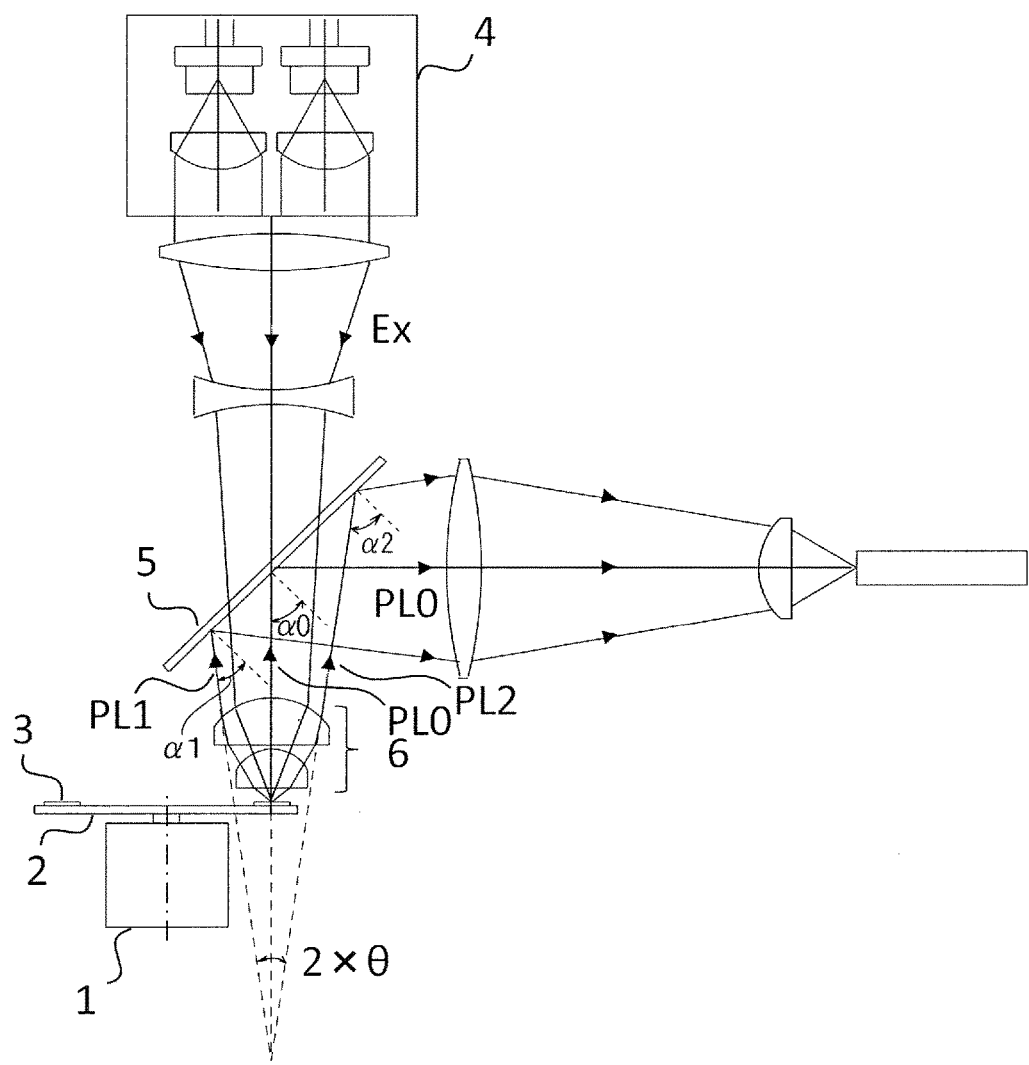
FIG. 12 is a diagram illustrating a configuration of a light source device in the related art.
Figure 13:
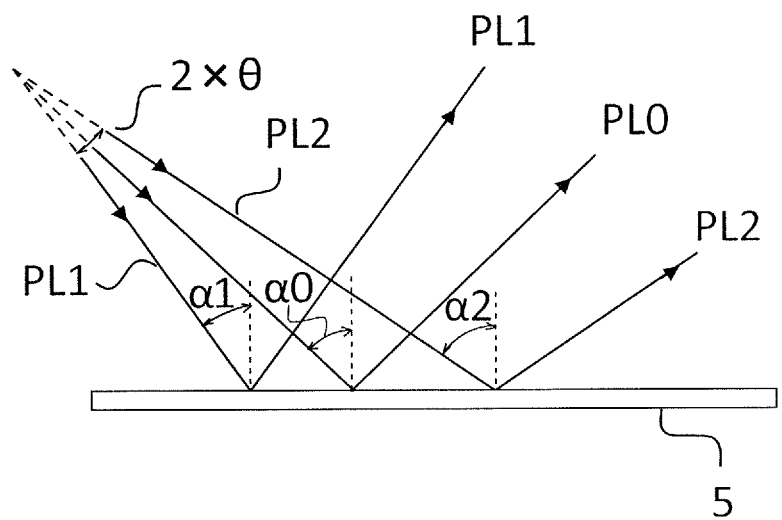
FIG. 13 is a diagram illustrating a difference between incident angles to a dichroic mirror in the related art.

In determining the arc with the radius Ryz, as illustrated in FIG. 11B, a radius that is similar to that of a circle may be obtained using coordinates of three points L, C, and U on an elliptical surface that serves as a reference. Furthermore, as illustrated in FIG. 11C, the length of the radius Ryx of the arc that is viewed when the toroidal surface is cut along an XY plane and the length of the short axis b of the elliptical surface that serves as a reference may be equal to each other.

Although the toroidal surface in question is used, because the difference between the incident angles can be greatly reduced when compared with a planar dichroic mirror in the related art, the light source device in which the color irregularity is reduced and the projection type display apparatus that uses the light source device are possibly provided.

Furthermore, although not corresponding to the elliptical surface or the toroidal surface in the strict sense, it is also possible that an aspherical surface that is substantially similar to these is employed.

Other Embodiment 3

The light source device for the projection type display apparatus according to the present invention, the material, the shape, or the positioning of the phosphor is not limited to those examples in the description so far. Phosphors other than the phosphors for the red light emission, the green light emission, the yellow light emission, and the white light emission may be provided.

Furthermore, no limitation to the providing of the phosphor on the link area on the principal surface of the rotator is imposed. An inclined surface or a side surface of the rotator may be provided.

Furthermore, besides a base body that rotates, the phosphor may be provided on a base body that moves in a different manner, for example, a base body that reciprocates in a straight line. In short, the provision may be selected arbitrarily in order to suppress deterioration of the phosphor due to irradiation of the excitation light at a fixed position.

In the case where the home position continues to be illuminated, if a cooling mechanism that can provide sufficient cooling is provided or a material for a phosphor that is unlikely to cause deterioration is used, the base body may be fixed.

According to the embodiments of the present invention, the light source device can be provided that reduces the difference between the incident angles depending on the place of the illumination light that is incident on the dichroic mirror, to a more remarkable extent than in the related art. That is, because the nonuniformity of the transmission and reflection in the diachronic mirror due to the difference between the incident angles can be greatly reduced, the light source is possibly provided that can output with high efficiency the good-quality illumination light which achieves the low-level color irregularity and the slight reduction in the light amount. Additionally, the projection type display apparatus that includes the light source device in question, which provides a high-definition image, can be provided at a low cost.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A light source device for a projection display apparatus, comprising:
   a phosphor;
   an excitation light source configured to output excitation light for exciting the phosphor;

a surface-curved dichroic mirror having a curved surface and being configured to cause one of the excitation light from the excitation light source and fluorescence from the phosphor to pass through the curved surface and to cause the other of the excitation light and the fluorescence to be reflected along an optical path which is different from an optical path of the one of the excitation light and the fluorescence after passage through the curved surface; and a converging lens formed separately from the surface-curved dichroic mirror and positioned between the surface-curved dichroic mirror and the phosphor, wherein the surface-curved dichroic mirror is configured to cause the one of the excitation light and the fluorescence after passage through the curved surface, neither to substantially converge, nor to substantially diverge, but converge the other of the excitation light and the fluorescence that is reflected, on a direction which is different from a direction of the optical path of the one of the excitation light and the fluorescence after passage through the curved surface.

2. The light source device according to claim 1,
wherein the surface-curved dichroic mirror is configured to cause light incident on a concave surface along an optical axis of the converging lens, to be reflected at an angle ranging from 80 degrees to 120 degrees.

3. The light source device according to claim 1,
wherein dispersion in an incident angle when the excitation light or the fluorescence is incident on the surface-curved dichroic mirror is half or less of a light flux half-angle of the excitation light or the fluorescence.

4. The light source device according to claim 1,
wherein the curved surface is a portion of an elliptical surface, a toroidal surface, or an aspherical surface.

5. The light source device according to claim 1,
wherein the surface-curved dichroic mirror is configured to reflect the fluorescence on a concave surface thereof.

6. The light source device according to claim 1,
wherein the surface-curved dichroic mirror is configured to reflect the excitation light on a concave surface thereof.

7. The light source device according to claim 1,
wherein the surface-curved dichroic mirror comprises a dielectric multilayer film formed on a surface-curved transparent substrate having a fixed thickness.

8. The light source device according to claim 1,
wherein the phosphor covers at least a portion of a rotator rotatable about a rotation shaft.

9. A projection display apparatus comprising:
the light source device according to claim 1;
a light modulation element; and
a projection lens.

* * * * *